United States Patent

[11] 3,554,165

| [72] | Inventor | Vernon Carter<br>8575 Upper Miamisburg Road,<br>Miamisburg, Ohio 45342 |
|---|---|---|
| [21] | Appl. No. | 743,174 |
| [22] | Filed | July 8, 1968 |
| [45] | Patented | Jan. 12, 1971 |

[54] ANIMAL FEEDER
10 Claims, 5 Drawing Figs.

[52] U.S. Cl. .................................................. 119/18, 119/61
[51] Int. Cl. ...................................................... A01k 05/00
[50] Field of Search ............................................ 119/18, 17, 51, 61

[56] References Cited
UNITED STATES PATENTS

| 1,853,214 | 4/1932 | Little ........................... | 119/17 |
| 2,562,691 | 7/1951 | Beringer ...................... | 119/61X |

*Primary Examiner*—Hugh R. Chamblee
*Attorney*—Jerome P. Bloom

ABSTRACT: A cage mounted feed tray or the like having a traylike portion to dispose in a cage and a handle portion to project outside the cage, tabular sections at the base of the handle being deformed to interengage with cage bars to firmly support and stabilize the tray.

PATENTED JAN 12 1971 3,554,165
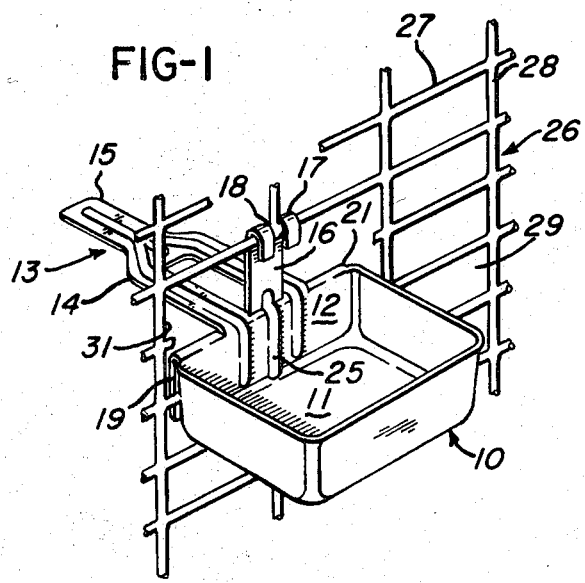
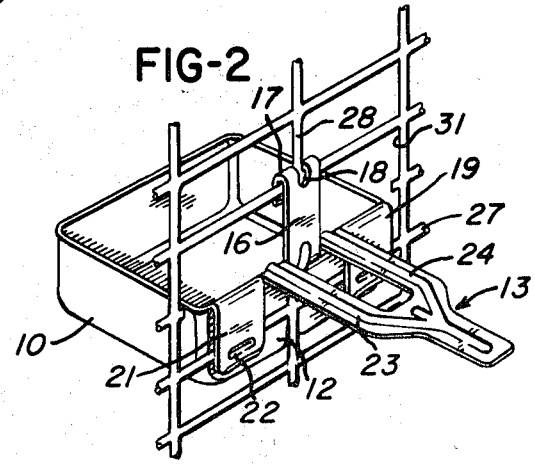
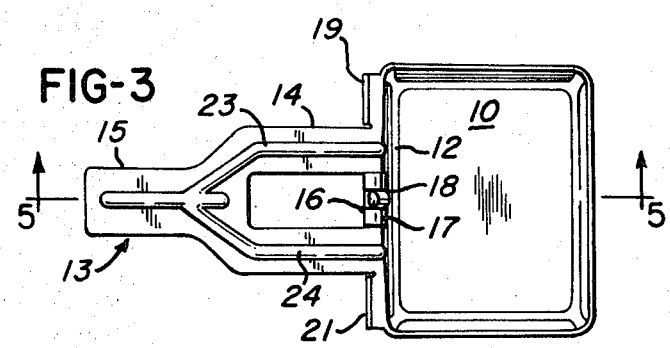
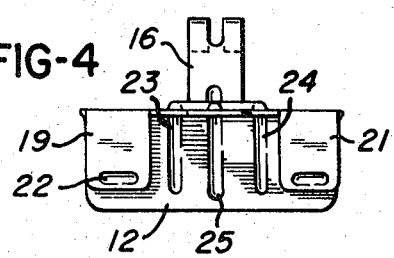
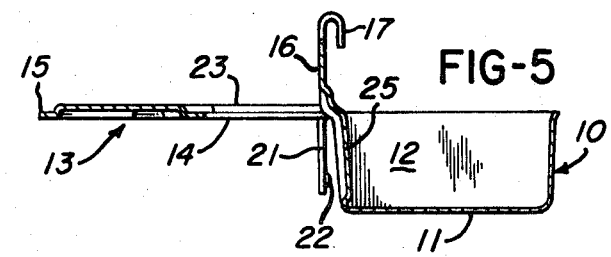
INVENTOR
VERNON CARTER
BY Jerome P. Bloom
ATTORNEY

ANIMAL FEEDER

This invention relates to traylike devices for temporary mounting on animal and bird cages for use as a feeder, utility shelf, perch or like purpose. Although not so limited in application, the invention has had particular advantage in reference to feed trays for small animals, for example chinchillas.

Feed trays for animal cages as heretofore known have for the most part been either a permanent part of the cage structure or introduced into and removed from the cage, as required, through a cage door. In the former instance the trays are relatively inaccessible for filling and for cleaning. In the latter instance the cage door must be opened, raising the possibility of escape and requiring the attendant to insert his hand into the cage. Further, independent, separable trays as heretofore proposed do not offer the stability needed for an animal to properly feed and may be easily upset.

Obvious benefits and advantages are inherent in a feed tray not subject to the deficiencies of the prior art, and it is a leading object of this invention to provide a tray so characterized. In carrying out such object there has been devised a tray structure of such simple, inexpensive construction as to be practicably available to the commercial raiser and hobbyist alike at a low and reasonable cost. It comprises a tray portion, a handle portion and cage engaging portions. It is attachable to the cage in a manner to place the tray portion inside the cage and the handle portion outside, it being unnecessary at any time for the hand of the attendant to enter or even closely to approach the interior of the cage. The cage engaging portions are adapted to interfit with bars of the cage in a manner not only to suspend the tray in an intermediate position for convenient feeding but to stabilize the tray against animal induced tilting and sliding movements. The construction lends itself to simple manipulation. On grasping only the handle, which is uniquely formed, the tray may be readily advanced into cooperative relation with the cage and firmly interengaged with the cage bars, and subsequently be released and withdrawn.

Another object of the invention is to provide for low-cost manufacture of the tray, it being contemplated that it shall have a unitary one-piece character, stamped or otherwise formed out of lightweight sheet metal, plastic or the like. According to a feature of the invention, attachment means secures the tray against displacement relative to the cage, making it unnecessary to rely on a weighted construction for stability.

A further object of the invention is to form the tray with integral ruggedly formed lightweight portions bent or deformed as tabs to provide its attachment means.

Still another object of the invention is to provide from one piece of material an animal feed tray with a projected handle portion including a tabular engagement portion outstruck from the handle and formed for plural engagement with cage bars in a manner to resist relative displacement of the tray in two senses.

A still further object of the invention is to provide an animal feeder in the form of a one-piece unitary lightweight tray having traylike and handle portions in which such portions are uniquely formed for strengthening purposes.

A further object of the invention is to provide a feed tray for animals possessing the advantageous structural features, the inherent meritorious characteristics and the mode of operation herein mentioned.

With the above and other incidental objects in view as will more fully appear in the specification, the invention intended to be protected by letters patent consists of the features of construction, the parts and combinations thereof, and the mode of operation as hereinafter described or illustrated in the accompanying drawings, or their equivalents.

Referring to the accompanying drawing wherein is shown one but obviously not necessarily to only form of embodiment of the invention:

FIG. 1 is a view in perspective of a feed tray in accordance with the illustrated embodiment of the invention, shown mounted on a section of an animal cage, the view being taken as the tray would appear from the cage interior;

FIG. 2 is a view similar to FIG. 1, taken as the tray would appear from the cage exterior;

FIG. 3 is a top plan view of the feed tray;

FIG. 4 is an end view of the tray, taken from the handle end thereof; and

FIG. 5 is a view in longitudinal section, taken substantially along the line 5–5 of FIG. 3.

Like parts are indicated by similar characters of reference throughout the several views.

Referring to the drawings, the invention device is disclosed as an animal feed tray, that is, a tray featuring a recessed receptacle to hold food or drink for an animal and so mounted on or disposed in a cage as to be accessible to the animal for self-feeding. As heretofore noted, and as will be evident from the drawings and description of the device in its illustrative embodiment, the inventive concept extends to cage mounted devices both of general and of specifically different utility.

In the illustrated instance, the feed tray has a preferred one-piece unitary construction, being formed in a stamping or like process out of a single sheet of material, as for example lightweight sheet metal. It comprises a traylike portion 10 formed as a recessed generally rectangular receptacle having a flat bottom 11 and upstanding marginal walls, including a backwall 12, the top of the receptacle being open. A handle portion 13 projects generally perpendicular to and laterally from the plane of and merging with the upper marginal edge of such backwall. The handle 13 includes a relatively broad base portion 14 spread by a bifurcation and a narrower projected outer extremity 15, the latter being adapted for grasp between fingers of a person handling the tray. A rectangular central section of material which would normally form part of the base portion of handle 13 is outstruck therefrom to assume the character of a tab 16 and produce thereby the bifurcation.

The outstruck portion or tab 16 is bent upwardly to assume a generally perpendicular position relative to the handle 13. Its upper extremity is bent over to form a hook 17 and such hooked extremity is bisected by a short length slot 18. In flanking, side-by-side, relation to base portion 14 of the handle 13 are other tabs 19 and 21. These are turned oppositely to the tab 16 or downwardly to occupy positions in adjacent, substantially parallel relation to the backwall 12 of traylike portion 10. So disposed tabs 16, 19 and 21 occupy a generally common plane.

In the forming operation individual beads 22 are impressed in the outer ends and transversely of the tabular means 19 and 21 to act as detents, as will hereinafter more clearly appear. A rib or bead centered to extend longitudinally of handle portion 15 includes divergent branch beads 23 and 24 formed in and extending lengthwise of the bifurcated portions of the base handle portion 14. The latter beads extend into traylike portion 10 and down the backwall 12 thereof in parallel spaced lines and have a strengthening function, resisting bending and deforming of the device. A shorter length bead 25 extends up the backwall 12 of traylike portion 10 and partly into the outstruck tab 16 and serves a like purpose. Bead 25 is generally parallel to the flanking beads 23 and 24.

As will be understood, according to a convenient method of fabrication, the tabular means 16, 19 and 21 may have an initial character as a part of the handle portion 13, disposing in a common plane therewith. In steps subsequent to the initial forming operation, sections to form the tabular means are separated and bent out of the plane of the handle to the respective positions shown.

The tray of the invention is adapted for use with an animal cage 26 of open work construction, that illustrated being made of interwoven or intersecting wires or rods including horizontal members 27 and vertical members 28. A network of open generally rectangular spaces 29 is thus provided. Rectangularly intersecting segments are removed from the cage structure to produce a rectangular opening 31 corresponding in area to four spaces 29. The dimensions of the traylike portion 10 of the feed tray is made such as to allow it to be introduced into and withdrawn from the cage through this enlarged opening 31.

In the application of the tray it is advanced upon the cage from the exterior thereof, handle portion 13 being held in the grasp of the attendant. Traylike portion 10 is inserted through opening 31 in a relatively elevated attitude so that bottom 11 and dependent tabs 19 and 21 may clear the lower margin of opening 31. The introducing motion is continued until traylike portion 10 is fully received within the cage, a position which may be signalled by engagement of the upstanding tab 16 with the cage bars. While the attendant continues to hold the handle 13 in his grasp the tray is lowered. In such motion, the lower marginal edge of opening 31, as defined by a horizontal bar segment 27, is frictionally received between the backwall 12 of portion 10 and the tabs 19 and 21, the bar segment 27 being snapped past the projected beads 22. The latter are resiliently displaced in the process and returned to immediately underlie the bar segment. Within the course of the lowering motion the hooklike outer extremity of tab 16 also descends upon the upper marginal edge of opening 31 as defined by its uppermost horizontal bar segment 27. The spacing of tabs 19 and 21 from the wall 12 and the opening of the hook on tab 16 is such as to provide a close adherence to the cage elements. The tray device is thus anchored and contained on the cage wall by a three-way triangular arrangement of cage engaging means which act to effectively and frictionally resist and restrict relative movement of the tray. Detents 22 assist in this respect in providing an underlying seat to the lower bar segment 27 as the hook is contained to the bar segment 27 at the upper edge of the opening 31.

The tray may be left so suspended and when emptied can be removed by simple raising and withdrawing motions. Detents 22 on the tabs 19 and 21 resist twisting and accidental release of the tray from its mounted position.

In introducing the tray into the cage the slotted portion 18 of upstanding tab 16 is aligned with a vertical bar segment 28. As the tray is fully inserted, the slotted hook portion achieves an embracing relation to the vertical bar segment. This provides a further means of interengagement restricting relative sliding movement of the tray and tilting in a side to side sense. Tilting of the device in a fore and aft or longitudinal sense is inhibited by the vertically offset character of the triangular interengagement means, as well as by engagement of the backwall 12 of portion 10 with vertical cage segments 28 extending below the lower margin of opening 31.

The invention accordingly provides a self-stabilizing feed tray or like device which is simple and inexpensive to manufacture. The tray can readily be introduced into and withdrawn from an animal or like cage, working entirely from the exterior of the cage. Moreover, it features attachment means providing a stable and secure mounting of the tray device on the cage wall, one which is readily enabled and disabled by manipulation of the device through its exteriorly projecting handle. The bifurcated nature of the handle gives greater stability in handling the tray, avoiding spillage after the tray is filled with feed and during insertion in the cage. The form of the handle, the reinforcing beads on its bifurcated portions and the integration thereof to the tray portion gives considerable strength to the entire feed structure. This results in a feeder which is not only easy to use but one that is durable and rugged.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

I claim:

1. A feeder device for mounting on an animal or like cage, including a traylike portion to dispose within the cage, an attached handle portion to project outside the cage, and means positioned by introduction of said traylike portion into the cage for interengagement with the cage to establish a mounted relation of the device relative to the cage, said device being manipulative by said handle to advance it upon the cage and to withdraw it therefrom and to effect and to release the device from its interengagement with the cage in an advanced position, said interengaging means being located in the area of the juncture of said traylike and handle portions and having the form of hooklike means projecting angularly in respect to said handle portion, said device having a unitary one-piece construction with said handle portion merging integrally with said traylike portion, and said hooklike means being initially common to said handle portion and being bend out of the plane thereof.

2. A device according to claim 1, characterized in that said hooklike means includes tabular means bend upward out of the plane of said handle to interengage with an upper portion of said cage to suspend and stabilize said device.

3. A feeder device for mounting on an animal or like cage, including a traylike portion to dispose within the cage, an attached handle portion to project outside the cage, and means positioned by introduction of said traylike portion into the cage for interengagement with the cage to establish a mounted relation of the device relative to the cage, said device being manipulative by said handle to advance it upon the cage and to withdraw it therefrom and to effect and to release the device from its interengagement with the cage in an advanced position, said interengaging means including first and second tabular means located in the juncture of said traylike and handle portions and bent in respectively opposite directions out of the plane of said handle portion to engage with the cage at upper and lower portions.

4. A device according to claim 3, characterized in that said device has a one-piece unitary construction with said tabular means having an initial character as a substantially planar part of said handle and being displaced therefrom, the first tabular means including spaced-apart tabs, one on either side of the handle portion, and the second tabular means including a single tab outstruck from the material of the handle within the margins thereof to define means providing a triangular pattern of support.

5. A feeder device for mounting on an animal or like cage, including a traylike portion to dispose within the cage, an attached handle portion to project outside the cage, and means positioned by introduction of said traylike portion into the cage for interengagement with the cage to establish a mounted relation of the device relative to the cage, said device being manipulative by said handle to advance it upon the cage and to withdraw it therefrom and to effect and to release the device from its interengagement with the cage in an advanced position, said interengaging means including a first means projecting angularly of said handle portion and including a hooklike portion to fit over a horizontal bar of a cage and including further a recess to interfit with a vertical bar of the cage, said interengaging means further including a second means projecting substantially oppositely of the first means to fit over another horizontal bar of the cage vertically displaced from the one first mentioned.

6. A feeder device for mounting on an animal or like cage, including a traylike portion to dispose within the cage, an attached handle portion to project outside the cage, and means positioned by introduction of said traylike portion into the cage for interengagement with the cage to establish a mounted relation of the device relative to the cage, said device being manipulative by said handle to advance it upon the cage and to withdraw it therefrom and to effect and to release the device from its interengagement with the cage in an advanced position, said device having a unitary one-piece construction and being stamped or otherwise formed of lightweight sheet metal or the like, said traylike portion being formed as a recessed receptacle with said handle portion projecting in the plane of an edge thereof, said handle being bifurcated and having strengthening bead means extending longitudinally thereof which extend to and down a sidewall of the recessed container portion.

7. A feeder device for mounting on an animal or like cage, including a traylike portion to dispose within the cage, an attached handle portion to project outside the cage, and means positioned by introduction of said traylike portion into the cage for interengagement with the cage to establish a mounted relation of the device relative to the cage, said device being manipulative by said handle to advance it upon the cage and to withdraw it therefrom and to effect and to release the device from its interengagement with the cage in an advanced position, said device having a unitary one-piece construction, said handle portion having a relatively broad flat configuration to be easily grasped and manipulated, a section of the handle portion being outstruck and formed to interfit with a cage bar whereby to define at least a part of said interengaging means.

8. A device according to claim 1, wherein said hooklike means includes means for suspending the device from the cage and further includes tabular means bent downward out of the plane of said handle portion, said traylike portion including a wall dependent from said handle portion and with respect to which said tabular means is in a parallel spaced relation, a portion of said cage being received between said dependent wall and said tabular means in a mounted position of the device and said tabular means having detent means thereon cooperative with said wall and with said cage portion to resist dislodging of said cage portion from between said wall and said tabular means.

9. A feeder device for mounting on an animal or like cage, including a traylike portion to dispose within the cage and an attached handle portion to project outside the cage, and means positioned by introduction of said traylike portion into the cage for interengagement with the cage to establish a mounted relation of the device relative to the cage, said device having a form providing that it is manipulative by said handle to advance it upon the cage and to to withdraw it therefrom and said means being relatively disposed to provide in an advanced position and movement of the device in a single sense to connect the device in a suspended position, to position it against relative tilting and withdrawing movements and to position it to inhibit retracting thereof from the suspended position.

10. A device according to claim 9, characterized in that said means achieves a triangular arrangement of contact of said device with the cage, said interengaging means including a centrally positioned upstanding hook to fit over a portion of the cage for suspension purposes and further includes laterally spaced apart down-turned hook means to fit over another cage portion, said hook means being interfit with respective cage portions in a movement of the device in one direction in one sense, the down-turned hook means cooperating with the traylike portion of the device to resist inadvertent retracting movement of the device.